United States Patent
Leppin et al.

(10) Patent No.: US 6,946,017 B2
(45) Date of Patent: Sep. 20, 2005

(54) PROCESS FOR SEPARATING CARBON DIOXIDE AND METHANE

(75) Inventors: Dennis Leppin, Chicago, IL (US); Alwarappa Sivaraman, Sugarland, TX (US)

(73) Assignee: Gas Technology Institute, Des Plaines, IL (US)

( * ) Notice: Subject to any disclaimer, the term of this patent is extended or adjusted under 35 U.S.C. 154(b) by 91 days.

(21) Appl. No.: 10/728,332

(22) Filed: Dec. 4, 2003

(65) Prior Publication Data

US 2005/0120878 A1 Jun. 9, 2005

(51) Int. Cl.$^7$ .......................... B01D 53/34; C01B 31/20
(52) U.S. Cl. ........................ 95/139; 423/220; 585/15
(58) Field of Search ................ 95/236, 139; 423/220, 423/230; 585/15, 801, 820, 833

(56) References Cited

U.S. PATENT DOCUMENTS

| | | | |
|---|---|---|---|
| 5,434,330 A | * | 7/1995 | Hnatow et al. ............. 585/864 |
| 6,028,234 A | * | 2/2000 | Heinemann et al. .......... 585/15 |
| 6,352,576 B1 | * | 3/2002 | Spencer et al. ............... 95/236 |
| 2003/0178195 A1 | * | 9/2003 | Agee et al. .................. 166/248 |
| 2004/0060438 A1 | * | 4/2004 | Lyon ........................... 95/153 |
| 2004/0074389 A1 | * | 4/2004 | Jackson et al. ................ 95/153 |

FOREIGN PATENT DOCUMENTS

JP 06-071161 * 3/1994

* cited by examiner

*Primary Examiner*—Frank M. Lawrence
(74) *Attorney, Agent, or Firm*—Mark E. Fejer

(57) ABSTRACT

A process for separation of carbon dioxide and methane in which a gas mixture comprising carbon dioxide and methane is brought into contact with a methane hydrate solid material disposed in a reactor vessel, whereby the methane hydrate is displaced by carbon dioxide hydrate, thereby freeing the methane, which is then removed from the reactor vessel.

14 Claims, 2 Drawing Sheets

PROCESS FOR SEPARATING CARBON DIOXIDE AND METHANE

BACKGROUND OF THE INVENTION

1. Field of the Invention

This invention relates to a process for separating at least two hydrate forming gases in a gas mixture from each other. More particularly, this invention relates to a process for separating carbon dioxide and methane present in a gas mixture from each other.

2. Description of Related Art

High concentrations (greater than about 70% by volume) of carbon dioxide exist in large natural gas reservoirs, such as Moxa Arch in the Rocky Mountain region of the United States. In addition, natural gas produced from coal beds, that is, "coal bed methane", also has high concentrations of carbon dioxide. In both instances, it is necessary to remove the carbon dioxide prior to delivering the natural gas to a pipeline. As a result, this natural gas cannot be produced economically in the former case because of the high gas processing costs associated therewith, and, in the latter case, the costs of production are high.

Several processes have been proposed for addressing the issue of removing $CO_2$ from natural and other gases including the Ryan Holmes process, amine scrubbing, cellulose acetate membranes, controlled freeze zone process approach, carbon dioxide crystallization, and application of physical solvents. However, at least some of these processes are typically not suitable for processing streams in which high concentrations of carbon dioxide are present in association with other natural gas components such as methane and ethane. For example, gas streams comprising low concentrations of carbon dioxide, in the range of about 10–20% by volume, may be effectively treated using amines, and gas streams comprising medium concentrations of carbon dioxide, in the range of about 20–30% by volume, may be effectively treated using physical solvents such as methanol. However, physical solvent processes require a suitably high pressure in association with a suitably high concentration of the component to be removed, such that the product of the concentration and the pressure is a suitably high "partial pressure". Furthermore, conventional amine and physical solvent processes, even if operated at pressure, generally produce the captured, carbon dioxide-enriched stream at low pressure as necessitated by the conditions required to regenerate the amine or physical solvent stream for reuse.

SUMMARY OF THE INVENTION

Accordingly, it is one object of this invention to provide a process for separating carbon dioxide from a gas mixture comprising said carbon dioxide and methane.

It is one object of this invention to provide a process for separating carbon dioxide from a gas mixture comprising said carbon dioxide and methane in which said carbon dioxide comprises greater than about 70% by volume of said gas mixture.

It is yet a further object of this invention to provide a process for separating carbon dioxide from a gas mixture comprising said carbon dioxide and methane which does not require the use of high reactor vessel pressures as is typical of conventional processes.

It is another object of this invention to provide a process for separating carbon dioxide from a gas mixture comprising said carbon dioxide and methane that is more efficient than conventional processes.

These and other objects of this invention are addressed by a process in which a gas mixture comprising carbon dioxide and methane is brought into contact with a methane hydrate solid material disposed in a reactor vessel, whereby the methane hydrate is displaced by carbon dioxide hydrate, thereby freeing the methane, which is then removed from the reactor vessel. The methane hydrate may be formed from the freed methane, continuously or batch wise, as necessary to maintain an inventory of methane hydrate stoichiometrically in excess of the amount required to interact with the gaseous carbon dioxide feed to the reactor vessel. A stream of substantially carbon dioxide hydrate may be withdrawn from the reactor vessel and, by suitable control of temperature and pressure, decomposed to carbon dioxide and water. The water can easily be separated from the carbon dioxide by condensation and, if necessary, dehydration, such as by using triethylene glycol.

The process of this invention, although suitable for use at lower carbon dioxide concentrations, i.e. less than about 30% by volume, is particularly suitable for use with gas streams or mixtures having carbon dioxide concentrations above those where the aforementioned alternate technologies can effectively be employed, that is concentrations greater than about 30% by volume carbon dioxide. More particularly, the process of this invention is suitable for use with gas streams or mixtures having carbon dioxide concentrations in excess of about 70% by volume. In addition, because the required pressures for formation of hydrate are moderate, the pressure for operation of the process can be set to accommodate the available pressure of the gas. Furthermore, because the captured carbon dioxide can be liberated at essentially the pressure of the reactor vessel, which can be operated at arbitrary pressures, such pressures may be selected for minimizing downstream compression costs or overall process equipment cost.

Although described herein primarily in the context of natural gas or methane gas streams comprising carbon dioxide, it is to be understood that the process of this invention is equally applicable to any gas mixture comprising at least two hydrate forming gases, where one of the hydrates formed by one of the hydrate forming gases is less stable than the hydrates formed by the other of the hydrate forming gases, and all such gas mixtures should be considered to be within the scope of this invention.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Figure 1:
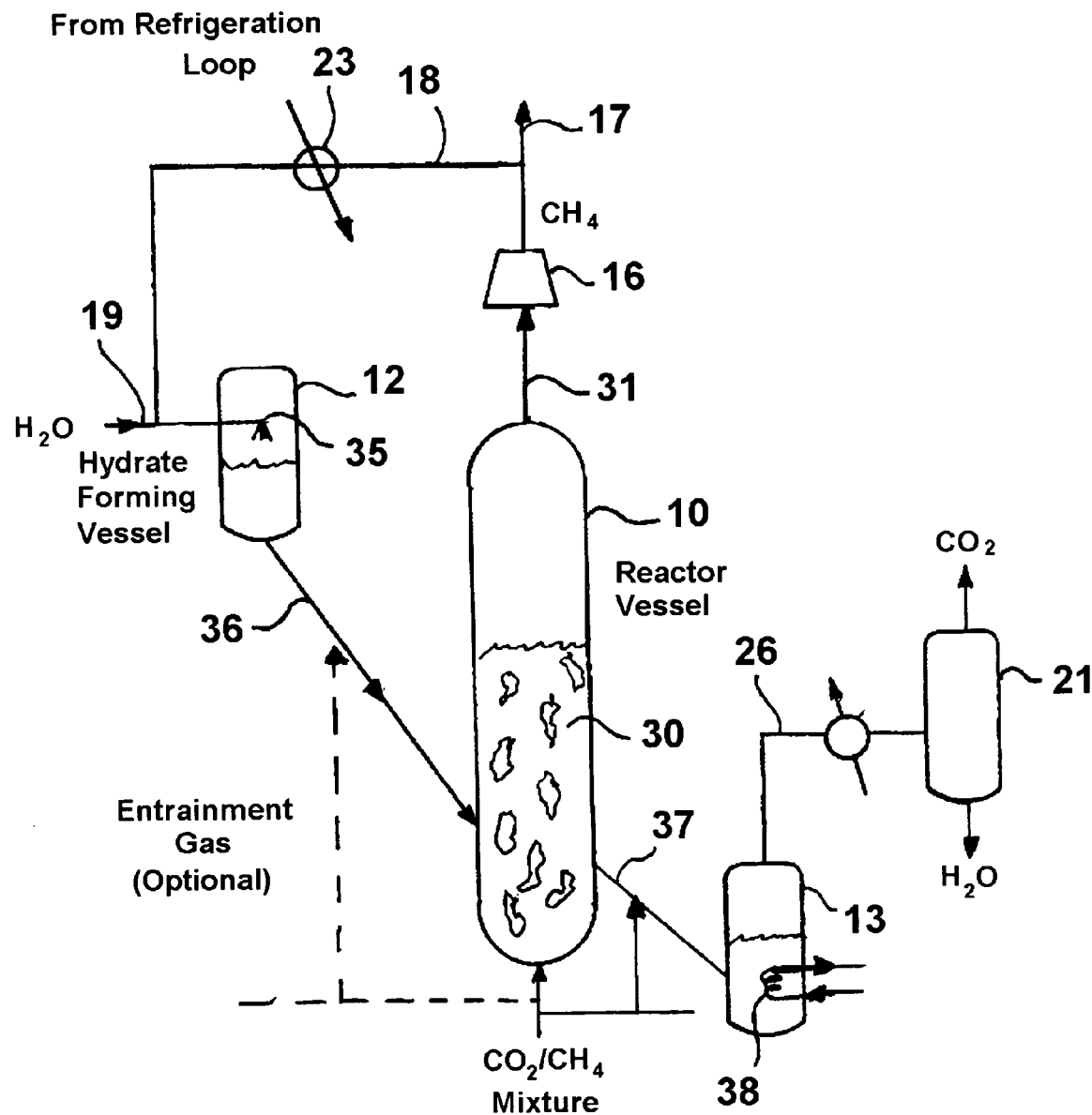
FIG. 1 is a schematic process diagram showing one embodiment of the process of this invention.

The invention claimed herein is a process whereby a gas stream, such as sub-quality natural gas, comprising a high concentration of carbon dioxide (defined herein as being greater than about 30% by volume), is introduced into a reactor vessel to contact methane hydrate solids disposed within the reactor vessel to effect the transfer of carbon dioxide into the structure of the hydrate and, in so doing, liberate the methane, producing methane-enriched gas. A stream of carbon dioxide enriched hydrate is withdrawn from the reactor vessel and decomposed to its constituent elements, carbon dioxide and water, which can, if desired, be separated into pure carbon dioxide and water by well known means. Suitable reactor vessels for use in the method of this invention include, but are not limited to, fluidized bed, fixed bed, and transport reactors. The methane-enriched gas produced in the process of this invention may be sent to a methane hydrate forming apparatus, which may consist of a spray tower operated at appropriate conditions for formation of methane hydrate. Methane hydrate formed for use in the process of this invention must be of a size which permits easy transport to the reactor vessel and must have sufficient accessible surface area to permit rapid mass transfer of the carbon dioxide and methane.

Sufficient accessible surface area is accomplished in accordance with one embodiment of this invention by providing highly porous methane hydrate. Alternatively, sufficient accessible surface area may be provided, in accordance with one preferred embodiment of this invention, by interstitial incorporation of the methane hydrate into a particle bed, such as a bed of sand or similar material capable of withstanding the conditions of operation of this method. This may be accomplished, in accordance with one embodiment, by forming a mixture of sand and water in a reactor vessel and adding the methane hydrate to the mixture. The presence of the sand or similar material provides a level of porosity whereby the carbon dioxide-containing gas mixture is able to penetrate into the bed and contact the methane hydrate within the bed. Although preferred, it will be understood by those skilled in the art that porosity in the form of porous methane hydrate or interstitial incorporation of the methane hydrate into a particle bed as described herein is not a requirement for successful implementation of the method of this invention. Although perhaps not as efficient, the method of this invention may be accomplished in a reactor vessel comprising solid methane hydrate.

It is not necessary that the process of this invention provide a complete and perfect separation of the carbon dioxide and methane, but rather merely that a substantial methane enrichment occurs. In accordance with one embodiment of this invention, multiple stages, i.e. reactor vessels, may be employed to effect further separation as required by product purity requirements. Alternatively, in accordance with another embodiment, after one stage of application of the process of this invention to a gas mixture, further separation may be carried out using hybrid processes which are more economical or otherwise desired using processes known to those skilled in the art such as those described herein above. In addition to the methane liberated by the carbon dioxide entering the hydrate structure and displacing the methane, gas leaving the reactor vessel comprises primarily the hydrocarbon and/or inert streams entering the reactor vessel with the sub-quality gas stream. The stream leaving the reactor vessel may be compressed or a slipstream returning to the methane hydrate forming vessel may be compressed to compensate for any pressure drop occurring in the system and to achieve the pressure in the stream required to form the hydrate. In addition, the stream may be cooled to the temperature required for methane hydrate formation. By way of example, the stream may be compressed to a pressure of about 700 psia and cooled to a temperature of about 2° C.

Heat exchangers are employed for cooling the hot stream, such as a compressor outlet stream, and heating of cold streams, such as the carbon dioxide hydrate exiting the reactor vessel. In accordance with one preferred embodiment of this invention, the heat exchangers are arranged so as to advantageously utilize the available heat energy and heat sinks are arranged so as to minimize heat exchanger area requirements. Any means of external chilling or refrigeration which can reach the desired temperature may be employed. This may be a commercial refrigerant system or propane refrigeration system as commonly employed in the hydrocarbon processing industries. Means are also required for heating the carbon dioxide hydrate in the carbon dioxide hydrate decomposition vessel. This can be an internal heating coil or introduction of a warm fluid, including but not limited to water. The water/carbon dioxide stream resulting from the warming of the reactor exit stream containing the carbon dioxide hydrate can be further separated into a relatively pure carbon dioxide stream and a condensed water product. The latter can be utilized in the hydrate forming step, which would further reduce or possibly eliminate the requirement for external process water. The carbon dioxide leaving the water condenser step could be further dried to desired levels using well-known dehydration techniques, such as treatment with triethylene glycol or solids desiccants such as calcium chloride.

The process of this invention also requires means for transporting the methane hydrate into the reactor vessel and means for removing a stream of carbon dioxide and carbon dioxide-enriched hydrate to the carbon dioxide hydrate decomposition vessel. These may be solid transport pipes utilizing gravity flow or gas assisted entrained flow as is well-known and commonly employed in fluid catalytic crackers, circulating fluid bed combustors and similar industrial processes.

Stripping gas comprised of feed gas at appropriate temperature and pressure conditions to avoid premature destruction of hydrate may be employed in the transport lines to strip or remove undesired components or to effect further reaction of carbon dioxide with the methane hydrate. For example, in the solid withdrawal line from the reactor vessel, a side stream of sub-quality feed gas could be used to transport the gas to the carbon dioxide hydrate decomposition vessel which would strip away and return to the vessel any methane entrained with the solids and further convert any unconsumed methane hydrate in the withdrawn stream.

Alternatively, a reactor vessel system comprising multiple reactor vessels may be employed in which one vessel is filled with the methane hydrate initially. The sub-quality feed gas comprising carbon dioxide and methane is fed to such vessel until the available supply of methane hydrate has been converted to carbon dioxide hydrate. The system is equipped with switching valves enabling the isolation of the vessels from each other and the feed gas. The vessel which has been employed initially is then isolated and the feed gas sent to a substantially identical second reactor vessel which is fully loaded with methane hydrate. The first vessel is then heated by some suitable means, for example internal heating coils and/or subjected to a lower pressure, and/or introduction of warm water, at which the carbon dioxide hydrate is unstable. The unstable carbon dioxide hydrate decomposes to form a water/carbon dioxide stream which is then treated as described herein above for the off-gas from the carbon dioxide hydrate decomposition vessel.

FIG. 1 is a diagram showing the process for separation of carbon dioxide and methane in a gas mixture in accordance with one embodiment of this invention. As shown therein, a $CO_2/CH_4$ mixture stream is introduced into reactor vessel 10 containing a fixed or moving bed of methane hydrate solid material 30. The $CO_2/CH_4$ mixture stream flows upward through the bed during which carbon dioxide hydrate replaces the methane hydrate after which the stream, having been reduced in carbon dioxide concentration and enriched in methane concentration, exits reactor vessel 10 by means of line 31. The stream of gas exiting reactor vessel 10 is substantially enriched in methane. By appropriate adjustment of the $CO_2/CH_4$ gas mixture stream flow rates and size of the bed of methane hydrate solid material, the stream of exiting gas may be substantially pure methane.

The stream exiting reactor vessel 10 through line 31 comprises methane liberated from the methane hydrate originally present within reactor vessel 10 as well as methane present in the $CO_2/CH_4$ gas mixture input to reactor vessel 10. In accordance with one embodiment of this invention, a portion of the methane-enriched stream exiting reactor vessel 10 is directed into compressor 16 in which it undergoes compression. A portion of the compressed methane-enriched stream is then transported by means of line 18 into a refrigeration unit 23 in which it undergoes cooling. The remaining portion of the compressed methane-enriched stream is removed from the system through line 17. The cooled methane-enriched stream is then directed into line 19 in which it is mixed with water. The amount of methane employed for this purpose is preferably approximately the same mass of methane in aggregate as that originally present as methane in the hydrate in reactor vessel 10. The amount of water used is approximately equal in aggregate to that required to form methane hydrate from the incoming methane-enriched stream. The extent of compression and cooling of the methane-enriched stream exiting reactor vessel 10 is sufficient to produce hydrate forming conditions in hydrate forming vessel 12, e.g. about 700 psia at 2° C.

The water and methane-enriched stream are passed through spray nozzles 35 or other suitable mechanical devices in hydrate forming vessel 12 to produce hydrate of a size allowing it to flow through line 36 into reactor vessel 10. Simultaneously therewith, carbon dioxide hydrate formed in reactor vessel 10 is withdrawn through line 37 and directed into vessel 13 in which it is decomposed to carbon dioxide and water. This is accomplished by flowing a heated fluid through coils 38 disposed in vessel 13. A stream of carbon dioxide and water exits from vessel 13 through line 26 and flows into water knockout vessel 21 in which the carbon dioxide and water are separated. In accordance with one preferred embodiment of this invention, the water is returned to hydrate forming vessel 12 for generating additional methane hydrate.

Figure 2:
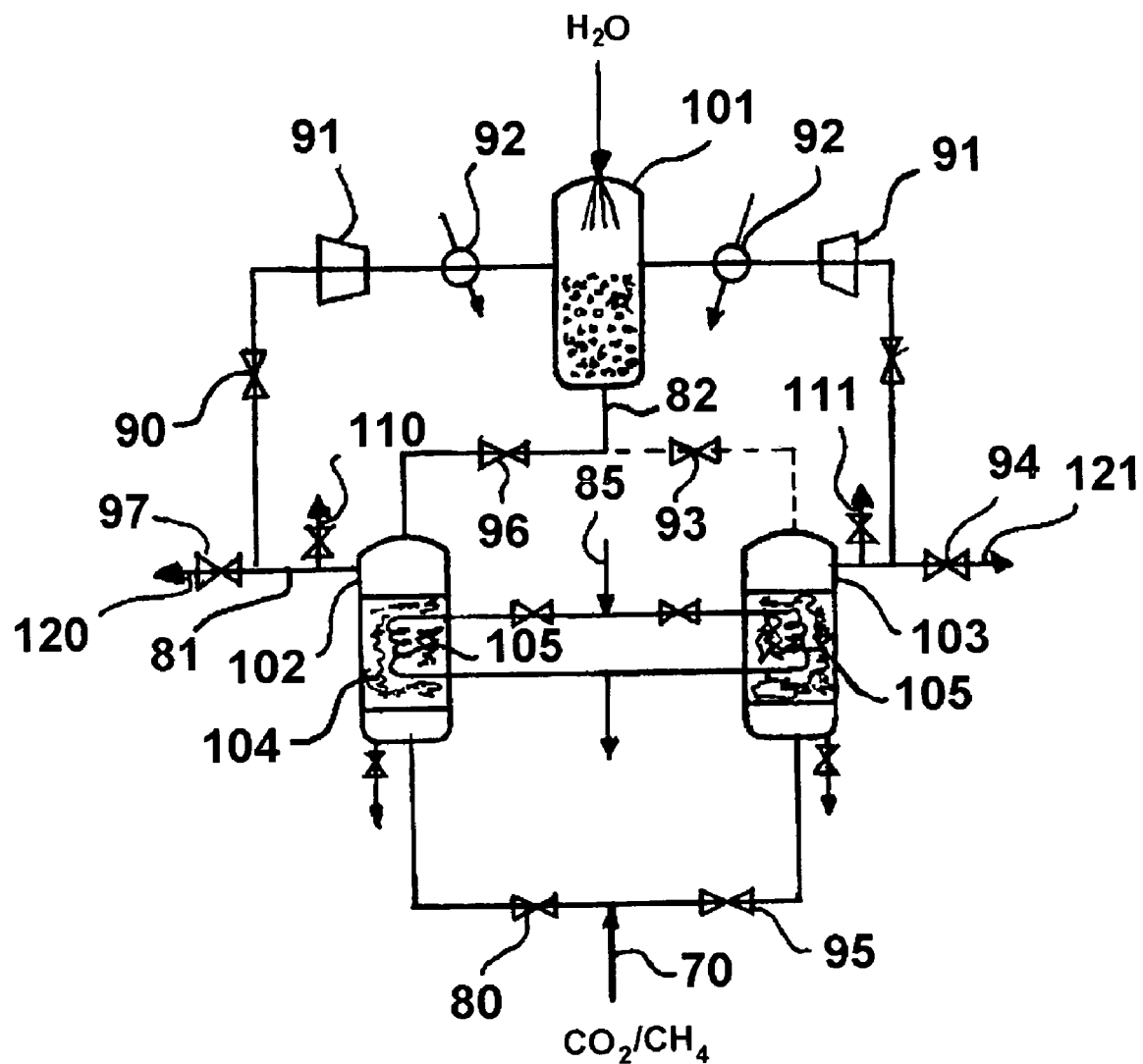
FIG. 2 is a schematic process diagram showing one embodiment of the process of this invention employing multiple reactor vessels.

A more complex system for carrying out one embodiment of the process of the invention utilizing multiple reactor vessels is shown in FIG. 2. As shown therein, a $CO_2/CH_4$ mixture (70% $CO_2$, 30% $CH_4$) is introduced into the system through line 70 and is admitted through valve 80 into reactor vessel 102, which has previously been filled with methane hydrate 104. The gas flows upward through the bed of hydrate 104 as a result of which the carbon dioxide in the $CO_2/CH_4$ gas mixture replaces the methane in the methane hydrate and the gas becomes methane-enriched. The methane-enriched gas exits reactor vessel 102 through line 81. A portion of the methane-enriched stream is passed through valve 90 into compressor 91 and cooler 92 after which it is introduced into hydrate forming vessel 101. The methane hydrate formed in hydrate forming vessel 101 exits through line 82 and is directed through valve 93 into reactor vessel 103. When the mass of methane hydrate being admitted into reactor vessel 103 reaches a predetermined height roughly corresponding to the practical capacity of reactor vessel 103, valve 93 is closed and valves 94 and 95 are opened.

Thereafter, valve 96 is opened and valves 90, 80 and 97 are closed, thereby effectively "switching" the functions of reactor vessels 102 and 103. That is, reactor vessel 102 becomes the vessel into which methane hydrate formed in hydrate forming vessel 101 is introduced and reactor vessel 103 becomes the vessel in which the $CO_2/CH_4$ gas mixture contacts the methane hydrate therein, resulting in capture of the carbon dioxide and release of the methane by the hydrate.

As previously described, the carbon dioxide hydrate formed in the system is preferably decomposed to water and carbon dioxide. This is accomplished by admitting a hot fluid through line 85 into coils 105 in reactor vessels 102 and 103. Gaseous carbon dioxide and water vapor are released through line 110 or 111, depending upon which of reactor vessels 102 and 103 is undergoing heat-up.

In accordance with one embodiment of this invention, the length of time for the heat-up plus the filling of the particular reactor vessel with hydrate coincides with the production time of the alternate reactor vessel in which the gas mixture is undergoing treatment. During the heat-up period, the production of methane hydrate in hydrate forming vessel 101 continues and the built-up inventory of hydrate is fed to the operative reactor vessel 102 or 103 at the appropriate time. The rate of hydrate production can be varied as necessary, or even discontinued, provided the hydrate production on average is sufficient stoichiometrically to ensure the desired amount of carbon dioxide capture. By this means, a nearly continuous flow of methane-enriched gas can be provided both to hydrate forming vessel 101 and to system exit lines 120, 121.

In accordance with one embodiment of this invention, a single compressor 91 and a single cooler 92 can be used by appropriate arrangement of piping and valves. Lines 120 and 121 may be joined into a common header so that a continuous flow of methane-enriched gas can be delivered. Additional vessels can be employed to allow for even more flexibility in the process and to allow the average flow rate delivered to the product lines to be closer to an average value that does not demonstrate any variations which may occur due to the switching of valves in less than an instantaneous time interval and due to variations in the mass transfer from the feed stream to the bed of hydrate at various points in the cycle, and during the relatively short period when the carbon dioxide hydrate is being decomposed. These improvements are not necessary to the basic concept which can even be implemented with a single reactor vessel (FIG. 1) provided interruptions in the delivery of the methane-enriched gas can be tolerated during the filling cycle when methane hydrate is being produced in the system.

In accordance with an alternative embodiment of this invention, the carbon dioxide hydrate is decomposed by releasing pressure on reactor vessel 102 or 103 by opening line 110 or line 111, respectively, to atmosphere or a flare line, but this procedure would require an extended period of time compared to the previously described heat-up method.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. In a reactor vessel containing a methane hydrate solid material, a process for separating carbon dioxide from a gas mixture comprising said carbon dioxide and methane, said process comprising the steps of:
   - contacting said methane hydrate solid material with said gas mixture, forming carbon dioxide hydrate; and
   - removing said methane from said reactor vessel.

2. A process in accordance with claim 1, wherein said carbon dioxide comprises at least about 30% by volume of said gas mixture.

3. A process in accordance with claim 1, wherein at least a portion of said carbon dioxide hydrate is removed from said reactor vessel.

4. A process in accordance with claim 3, wherein said carbon dioxide hydrate removed from said reactor vessel are decomposed, forming carbon dioxide and water.

5. A process in accordance with claim 1, wherein a portion of said methane removed from said reactor vessel is used to form said methane hydrate solid material.

6. A process in accordance with claim 1, wherein said reactor vessel comprises one of a fixed bed, fluidized bed and a moving bed of said methane hydrate solid material.

7. A process in accordance with claim 1, wherein said methane hydrate solid material is interstitially incorporated in a particle bed.

8. A process in accordance with claim 7, wherein said particle bed comprises sand.

9. In a gas mixture comprising a more stable hydrate-forming gas and a less stable hydrate-forming gas, a process for separating said more stable hydrate forming gas from said less stable hydrate forming gas comprising the steps of:
   - introducing a first hydrate solid material produced by said less stable hydrate forming gas into a reactor vessel;
   - contacting said first hydrate solid material with said gas mixture, whereby said first hydrate solid material is displaced by a second hydrate solid material, said second hydrate solid material formed by said more stable hydrate forming gas; and
   - removing said less stable hydrate forming gas from said reactor vessel.

10. A process in accordance with claim 9, wherein said more stable hydrate forming gas is carbon dioxide.

11. A process in accordance with claim 9, wherein said less stable hydrate forming gas is methane.

12. A process in accordance with claim 9, wherein at least a portion of said second hydrate solid material is removed from said reactor vessel.

13. A process in accordance with claim 9, wherein a portion of said less stable hydrate forming gas removed from said reactor vessel is recycled to form said first hydrate solid material.

14. A process in accordance with claim 9, wherein said first hydrate solid material in said reactor vessel is disposed in one of a fixed bed and a moving bed.

* * * * *